Figure 1:
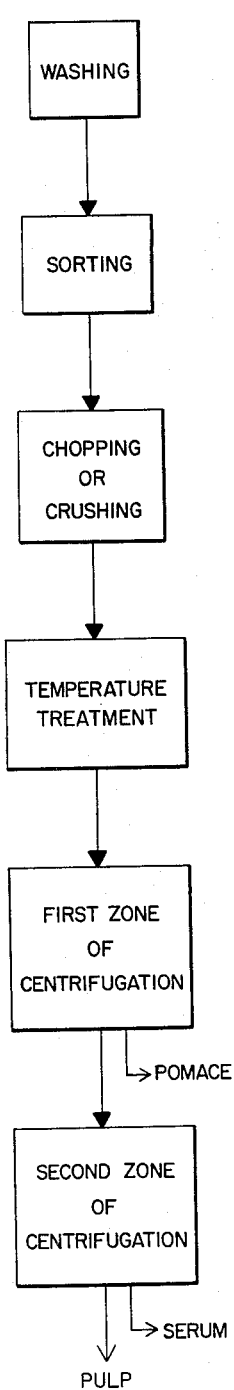

Aug. 25, 1964　　F. W. KEITH, JR　　3,146,198
CENTRIFUGE ESPECIALLY USEFUL IN CONCENTRATING
FRUIT AND/OR VEGETABLE SOLIDS
Filed Oct. 16, 1962

INVENTOR.
FREDERICK W. KEITH, JR.
BY Dallett Hoopes
ATTORNEY

United States Patent Office 3,146,198
Patented Aug. 25, 1964

3,146,198
CENTRIFUGE ESPECIALLY USEFUL IN CONCENTRATING FRUIT AND/OR VEGETABLE SOLIDS
Frederick W. Keith, Jr., Gladwyne, Pa., assignor to Pennsalt Chemicals Corporation, a corporation of Pennsylvania
Filed Oct. 16, 1962, Ser. No. 230,853
2 Claims. (Cl. 233—29)

This invention relates to the production of purees and pulp concentrates made from fruits and/or vegetables. More specifically this invention relates to the concentration by centrifugal force of portions of fruits and/or vegetables suitable for the production of an edible puree or pulp concentrate.

In the production of a puree or pulp concentrate from fruit and/or vegetable portions careful attention must be paid to the number of mold colonies and insect specks in the finished product. In this regard, the United States Department of Agriculture has imposed upon processors of such concentrates and purees a numerical rating above which the number of mold colonies or insect specks (collectively "foreign solids") irrespective of size cannot be tolerated. Additionally, various individual processors in order to maintain their reputation have imposed upon themselves even stricter limitations with regard to mold or insect speck counts.

Since this invention was conceived and perfected in the preparation of a tomato concentrate or puree it will be discussed herebelow in such an application. However, it should be understood that the invention may be practiced and benefits from the invention may be obtained similarly in the preparation of purees or concentrates of peaches, apricots, pears, and many other fruits and/or vegetables.

In the preparation of a tomato puree it is known after washing, sorting, chopping or crushing, and treating with heat or cold to destroy pectin-degrading enzymes and prevent further growth of mold colonies, to subject the slurry to at least one and usually two successive zones of centrifugal force. The first of these zones may take the form of a rotating screen rotating at a speed sufficient so that centrifugal force throws off liquid and soft pulp through the openings and urges the solids of the pomace against the screen to press out remaining liquid and soft pulp. Such a zone of centrifugation will eliminate from the slurry the seeds, skins, sun scalds, black spots, etc. which are extremely undesirable in finished product. The liquid or pulp discharge from such a first zone of centrifugation may then be passed to a solid-wall centrifuge for concentration of the solids.

The second zone of centrifugation may be a solid-wall centrifuge equipped with peripheral nozzles, and in operation the fluid discharge from the first zone is delivered to such a nozzle centrifuge at a first locus spaced inward from the peripheral wall. The solids are settled against the wall of the centrifuge rotor and the clarified liquid is discharged from a locus adjacent the axis. As the solids accumulate they are discharged through the peripheral nozzles and collected for further processing as desired or necessary.

To the best of my knowledge the use of such a nozzle centrifuge has never been completely satisfactory. The use of such a centrifuge has markedly increased the number of mold colonies and insect specks frequently above the point of governmental tolerance and hence the discharged pulp has not been suitable for consumer usage in products such as tomato sauce, or soup.

After much thought and experimentation, I have discovered that the increase in mold colonies and insect specks resulting from the use of a nozzle centrifuge in such a process is probably attributable to the high shear forces which the solids encounter adjacent the nozzles as they are discharged. These forces can break up mold colonies and insect specks to multiply their number.

My invention which is predicated on this discovery permits the use of centrifugal force of many times the acceleration of gravity to concentrate a fruit or vegetable slurry but at the same time avoids increase in the number of mold colonies and insect specks to exceed governmental limits and limits imposed upon themselves by individual producers.

Figure 2:
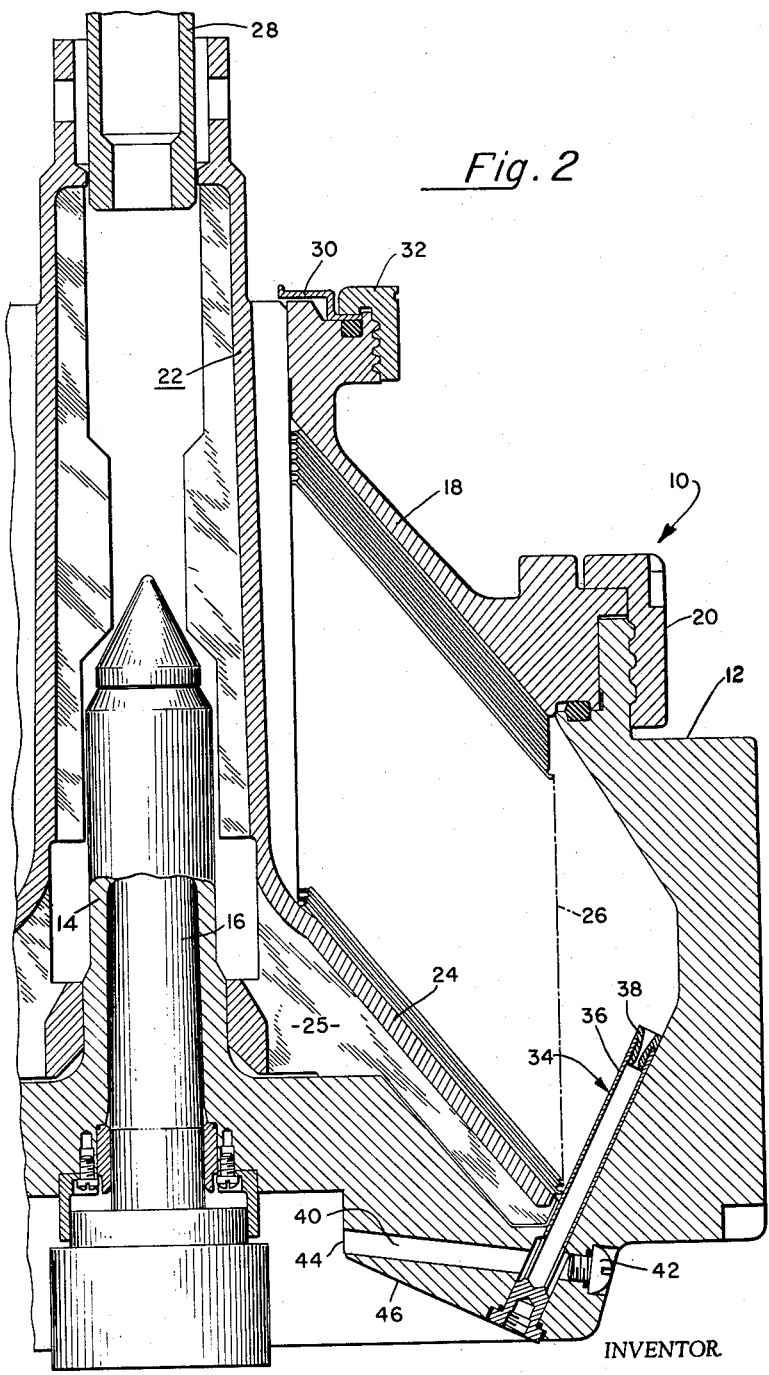

This invention embodies other novel features, details of construction and steps of which are hereinafter set forth in the specification and claims and illustrated in the drawings, wherein:

FIGURE 1 is a flow sheet representing a possible process line with which the invention is applicable; and FIGURE 2 is an enlarged fragmentary sectional view of a centrifuge embodying the invention.

Briefly, especially for fruit and/or vegetable processing, the invention is a centrifuge of the solid bowl type in which the solids discharge is brought inward through conduit means from the periphery of the bowl to discharge at a lesser radius through a large opening so that shear is reduced and the break-up of foreign solids is consequently minimized.

Referring more specifically to the drawings, the flow diagram of FIGURE 1 illustrates a process which may embody the invention. According to such process raw tomatoes are usually washed, sorted, chopped or crushed and then treated with a high temperature for a short time to destroy the pectin-degrading enzymes as well as to inhibit growth of mold colonies. From the temperature treatment the fruit or vegetable slurry may be delivered to a first zone of centrifugation which may comprise a basket centrifuge or similar centrifuge acting to classify the solids of the slurry. Through the perforations of the basket centrifuge liquid and soft pulp in the slurry passes, and centrifugal force, in urging solids in the slurry against the perforate wall of the centrifuge presses out additional liquid or soft solids. Alternatively the first zone of centrifugation may be replaced by a screen or strainer which may have a similar purpose, that is, to remove from the slurry seeds, skins, sun scalds, black spots, etc. which are highly undesirable in the finished product.

From the first zone of centrifugation or screen or equivalent device the liquid or pulp discharge is conducted to a second zone of centrifugation in which a clear or nearly clear serum is separated and a concentrated pulp is produced.

A centrifuge suitable as the second zone of centrifugation is shown in a fragmentary sectional view, FIGURE 2, and designated 10.

Such centrifuge may comprise a rotor 12 having a central hub 14 mounted to rotate with a spindle 16 adapted to be driven by drive means not shown. Closing the rotor is a cover 18 held in position by a ring element 20 threadedly engaging an outward projection of the rotor 12.

Setting on an annular shoulder in the rotor is a center tube 22 surrounding the upper portion of the spindle. The center tube has a flaring skirt 24 spaced above the lower surfaces of the rotor to permit passage of feed therebetween. Radial vanes 25 assure acceleration of the mixture at rotor speed.

The center tube 22 is surrounded by and the skirt 24 is superposed by a stack 26 of conventional frusto-conical separating discs, each appropriately spaced from its neighbors by radially disposed spacer elements. As is also conventional, feed tube 28 may extend downward into the center tube to supply feed thereto, and a ring dam or weir 30 is secured to the upper end of the cover 18 by a ring element 32, the dam comprising the clarified liquid discharge.

Attention is now directed to the conduit means generally designated 34 which comprises the solids discharge means and is an important element of the invention. The conduit means includes a tube 36 which is mounted in the lower wall of the rotor and extends upward and outward along the peripheral wall and terminates in a bushing 38 adjacent the outermost portion of the wall. Adjacent its lower end the tube 36 has a number of openings and these communicate with a substantially radially directed passage 40 in the lower wall of the rotor. The outer end of the passage is plugged by a threaded element 42, and the inner end terminates in an opening 44 in an inwardly facing surface in the rotor adjacent the spindle base. The undersurface 46 of the rotor slopes downward and outward from this opening.

It will be noted from further reference to the drawings, that the opening 44 is positioned only slightly outward with respect to the axis from the inner edge of the ring dam or weir 30. This outward positioning causes the solids which accumulate adjacent the periphery of the rotor to move through tube 36 and enter the passage 40 moving substantially radially inward. The bushing 38 is selected of an appropriate diameter to control this movement of solids. In a typical installation the bushing 38 is formed with an inner diameter of 0.10" and has its opening in the shape of a venturi to reduce turbulence and shearing forces as produced by an orifice plate.

The following examples are made not by way of limitation but to illustrate the invention.

*Example 1*

In a tomato puree and concentrating process line comparable to that diagrammatically illustrated in FIGURE 1, pulp discharge from a first zone of contrifugation was led to a second zone comprising a nozzle type disc centrifuge. The liquid discharged from the first zone had a mold count of 16. The second zone of centrifugation was a centrifuge comparable to that of FIGURE 2 but having 12 peripheral nozzles and no conduit means 34. The centrifuge was approximately 19" in diameter and was driven at a speed of 6250 r.p.m. The purified serum discharged over the ring dam and solids discharged through the nozzles. The solids were analyzed and found to have a mold count of 55.

*Example 2*

In this example the pulp which discharged from the first zone of centrifugation was delivered at approximately the same feed rate as that of Example 1 to a second zone of centrifugation which in this example comprised a centrifuge as shown in FIGURE 2 having 12 conduit means such as at 34. Clarified liquid discharged over the ring dam 30 and solids discharged through opening 44. The solids were analyzed and found to have a mold count of only 30. This count was well within the limit set by the processor, whereas the count of Example 1 was not.

While the precise reason for the success of my invention is not known, I am of the opinion that the improvement is attributable to a reduction in shear forces during solids discharge. Whereas in the nozzle centrifuge solids discharged from a nozzle having a bore of approximately 0.04" and at a pressure of upwards of 1000 pounds per square inch, in my process solids discharge from a much more generous opening and at a much lower pressure. Hence the shear forces are relatively mild in my process and the break-up of mold colonies is relatively small adjacent the solids discharge. Furthermore, the tangential velocity of the reduced radius of discharge reduces the likelihood of contact of the discharge with the discharge collectors (not shown) at a high impulse velocity. The solids which move outward from the opening 44 along the undersurface 46 are not accelerated to the speed of the bowl as they move outward since this surface has no accelerating vanes. Then too, some solids as they pass through opening 44 may be moving inward at a rate sufficient to merely drop down toward the base of the spindle 16 despite the outward urging due to centrifugal force.

From the above it can be seen that I have developed a process and apparatus which accomplishes the desired concentration of solids with a drastically lesser increase in mold and insect speck count as compared to prior methods. The invention, predicated on a discovery I made after much thought and experimentation may be readily practiced from the above description by those skilled in the art.

It is foreseeable that reasonable variations may be made in my invention; for instance, the disc stack 26 may be replaced by another type of accelerator, the configuration of the rotor may be changed, the method of segregating the inward flow path of the concentrated pulp may be different, etc. Such variations are within the scope of this invention.

Thus, having particularly described my invention, it is to be understood that the description is by way of illustration, and that changes, omissions, additions, substitutions and/or other modifications may be made without departing from the spirit thereof. Accordingly, it is intended that the patent shall cover by suitable expression in the claims the various features of patentable novelty that reside in the invention.

I claim:
1. A centrifuge for concentrating solid portions of fruits and/or vegetables while avoiding excessive break-up of foreign solids present comprising
   (a) a rotor mounted to rotate about an axis, the rotor including an imperforate cup-shaped shell having a peripheral wall and a lower wall having solids discharge openings spaced inward from said peripheral wall, and a frusto-conical top element having a central opening of lesser radius than the distance from the axis to any of the solids discharge openings and being mounted on said peripheral wall
   (b) a center tube having a lower skirt portion and an upper tubular portion, the center tube being disposed in said cup-shaped shell with its skirt spaced above said lower wall and the upper tubular portion extending upward through the central opening to define an annular clarified liquid discharge port
   (c) a disc stack disposed between the skirt portion and the top element
   (d) outlet tubes disposed in respective radial planes in the shell and having in their outer ends inserts providing restricted openings, their outer ends being disposed adjacent the inside surface of the peripheral wall and their inner ends having peripheral openings and being disposed in the lower wall
   (e) and passage means in the lower wall extending respectively from the inner end openings of the outlet tubes respectively inward to the solids discharge openings respectively, the restricted openings being smaller than the solids discharge openings whereby concentrated solids are brought inward through the restricted openings in the tubes through the tubes and passage means to discharge through the solids discharge openings at a relatively small radius under reduced shear.

2. A centrifuge as described in claim 1 wherein the restricted openings in the inserts are generally in the shape of a venturi.

(References on following page)

References Cited in the file of this patent

UNITED STATES PATENTS

| | | |
|---|---|---|
| 533,316 | Naylor | Jan. 29, 1895 |
| 600,684 | Daseking | Mar. 15, 1898 |
| 1,373,219 | Beach | Mar 29, 1921 |
| 1,749,291 | Lindgren | Mar. 4, 1930 |
| 1,933,119 | Peltzer et al. | Oct. 31, 1933 |
| 1,935,117 | Froding | Nov. 14, 1933 |
| 1,945,786 | Peltzer et al. | Feb. 6, 1934 |
| 2,070,966 | Svensjo | Feb. 16, 1937 |
| 2,087,630 | Schelbeck | July 20, 1937 |
| 2,148,826 | Mallard | Feb. 28, 1939 |
| 2,314,586 | Levison | Mar. 23, 1943 |
| 3,023,111 | Huber | Feb. 27, 1962 |
| 3,047,214 | Downing | July 31, 1962 |

FOREIGN PATENTS

| | | |
|---|---|---|
| 404,242 | Great Britain | Jan. 11, 1934 |
| 757,294 | France | Oct. 9, 1933 |
| 767,977 | France | May 7, 1934 |